Sept. 9, 1924.                       1,508,245
E. PETRACEK
LATCH DEVICE
Filed March 3, 1924
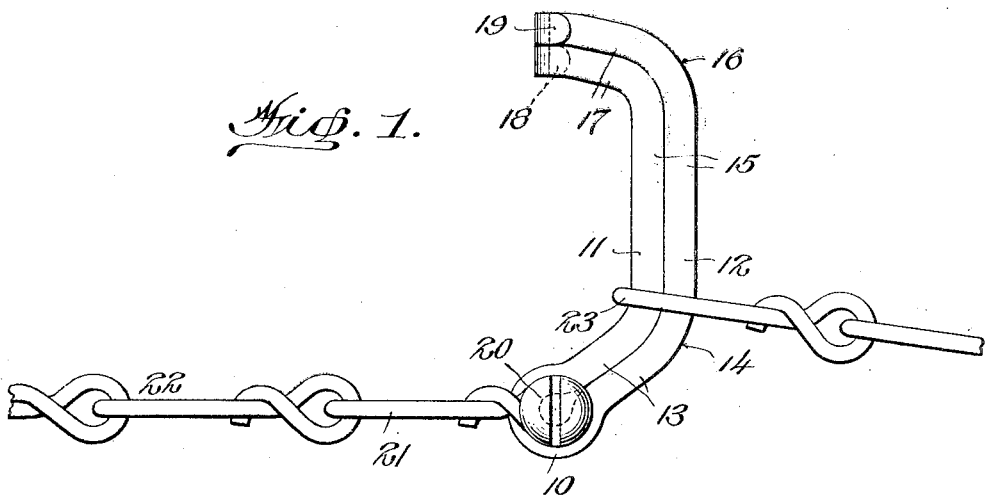
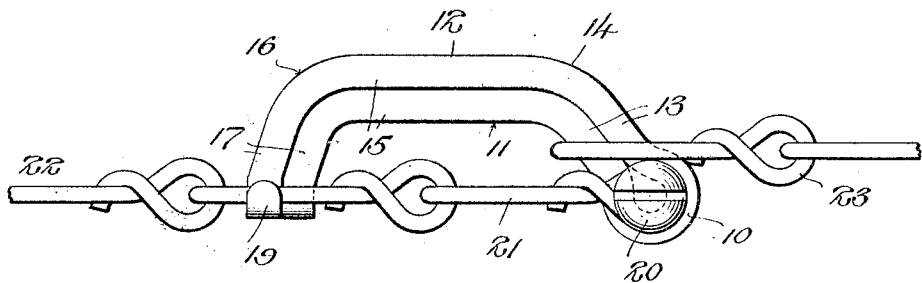
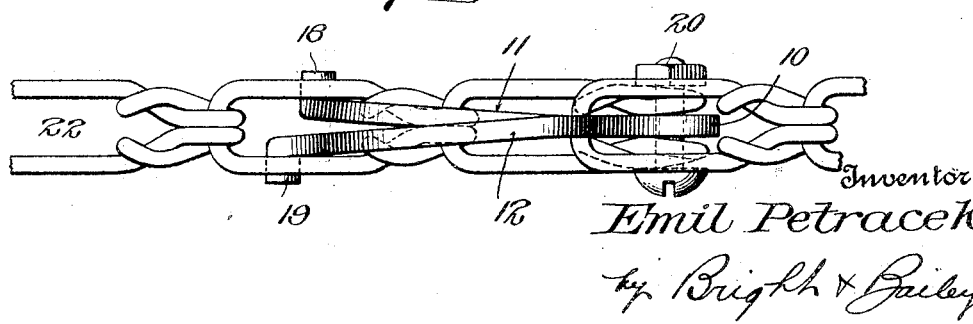
Inventor
Emil Petracek,
by Bright & Bailey
Attorneys Patented Sept. 9, 1924.

1,508,245

UNITED STATES PATENT OFFICE.

EMIL PETRACEK, OF OMAHA, NEBRASKA.

LATCH DEVICE.

Application filed March 3, 1924. Serial No. 696,630.

*To all whom it may concern:*

Be it known that I, EMIL PETRACEK, a citizen of the United States, and resident of Omaha, in the county of Douglas and State of Nebraska, have invented certain new and useful Improvements in Latch Devices, of which the following is a specification.

My invention relates to latch devices, and my purpose is to provide an improved latch that, while capable of other uses, is particularly intended for securing together the ends of anti-skid chains, such as are commonly used on automobile tires.

More specifically it is my purpose to provide a latch device of the kind mentioned that is formed from a single suitably shaped blank of sheet material; that is strong, durable and efficient for its purpose; that is cheap and easy to produce, easily manipulated, both to and from locked position, that cannot become unlocked accidentally, and that is of such construction that when operated from released to locked position when applying a chain to a tire the chain will be tightened upon the tire.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views Figure 1, an elevation showing the manner in which the ends of a chain are associated with my latch prior to manipulating the latter to locked position;

Figure 2, a view similar to Figure 1 showing the latch in locked position; and

Figure 3, an edge view of the latch and chain in the position these parts occupy in Figure 2.

My improved latch is formed from a single bar of inherently resilient material of preferably rectangular cross section, which bar is bent upon itself intermediate of its length to form an eye 10 and a pair of contiguous arms 11 and 12.

The arms 11 and 12 are extended radially from eye 10 a suitable distance as at 13 to a point 14 where they are bent at a suitable obtuse angle to their radial portions to then extend as at 15 a suitable distance obtusely to said radial portions and tangentially to eye 10 to a point 16 where they are again bent to extend as at 17 towards said eye at right angles or at a small obtuse angle to their portions 15, finally being terminated in outwardly directed hooks 18 and 19, respectively, alined substantially with said eye.

From point 14 arms 11 and 12 are diverged laterally with respect to the plane of the latch towards their free ends, as best shown in Figure 3, and normally they assume this relation due to their inherent resiliency. They are capable of being sprung together, however, to permit insertion of their hooked terminals through a link of a chain, and in this connection it will be observed that arm 12 is longer than arm 11 by an amount corresponding to or slightly greater than the width of the bar of material from which the latch is formed, whereby the portions 17 may be moved across one another to permit the arms to be sprung together, all as is clearly apparent.

A fastener 20 such as a bolt or rivet is engaged through the eye and by means of this fastener one terminal link 21 of a chain 22 is permanently secured to the latch, and when a chain is thus connected with the latch, the manner of using the latter to unite the chain ends is apparent: First, the chain is passed around the object to which it is to be applied and the terminal link 23 on the free end thereof is engaged over the arms 11 and 12 as shown in Figure 1. Pressure is then exerted on the free ends of the arms to swing them on fastener 20 as a pivot towards the terminal link 21, which movement of the arms results in a pulling action on both ends of the chain to draw the latter into firm engagement with the object, said pulling action being enhanced by the relative angular disposition of portions 13 and 15 of the arms 11 and 12. The arms then are sprung together and their free ends engaged through a link of the chain adjacent to the terminal link 21 and then allowed to spring outward, whereby the hooks 18 and 19 engage with the chain to securely lock the device in secured position. To release same the arms are sprung together to disengage the hooks from the chain and the arms then moved to their initial position.

I claim:—

1. A latch device for securing chain ends together formed from a single bar of material bent upon itself to provide a pair of contiguous arms and an eye at one end of said arms adapted to have a terminal link of a chain secured thereto, and a hook on the free end of each of said arms engageable with a link of a chain to lock the latch in engagement therewith, one of said arms being longer than the other whereby their hooked ends may be moved across one another to permit of their engagement with and disengagement from a chain.

2. A latch device for securing chain ends together formed from a single bar of material bent upon itself to form a pair of contiguous arms and an eye at one end of said arms adapted to have a terminal link of a chain secured thereto, the free end portions of said arms being extended angularly with respect to their intermediate body portions and terminating respectively in oppositely directed hooks adapted to engage with another link of the chain to lock the latch in engagement therewith, one of said arms being of greater length than the other whereby their hooked end portions may be moved across one another to permit of their engagement with and disengagement from a chain.

In testimony whereof I hereunto affix my signature.

EMIL PETRACEK.